United States Patent [19]

Renner et al.

[11] 4,098,531
[45] Jul. 4, 1978

[54] BODY FOR MOTOR VEHICLES

[75] Inventors: Hermann Renner, Magstadt;
Wolfgang Klie, Korntal, both of Fed. Rep. of Germany

[73] Assignee: Daimler-Benz Aktiengesellschaft, Fed. Rep. of Germany

[21] Appl. No.: 729,982

[22] Filed: Oct. 6, 1976

[30] Foreign Application Priority Data

Oct. 7, 1975 [DE] Fed. Rep. of Germany ....... 2544713

[51] Int. Cl.² ........................................... B61F 19/04
[52] U.S. Cl. .................................. 293/63; 296/28 R
[58] Field of Search .............. 293/1, 60, 63, 70, 71 R, 293/85, 86, 95; 296/28 R

[56] References Cited

U.S. PATENT DOCUMENTS 3,884,516 5/1975 Gallion ......................... 293/71 R X

*Primary Examiner*—Trygve M. Blix
*Assistant Examiner*—Sherman D. Basinger
*Attorney, Agent, or Firm*—Craig & Antonelli

[57] ABSTRACT

A body for motor vehicles, especially for passenger motor vehicles, with bumpers arranged in the front and/or rear area and with body cover panel parts adjoining the same, in which the body cover panel parts above the bumper are devoid of any connection with the bumper while the body cover panel part underneath the bumper forms a separate structural part independent of the upper body cover panel parts.

25 Claims, 2 Drawing Figures

U.S. Patent   July 4, 1978   4,098,531
FIG 1
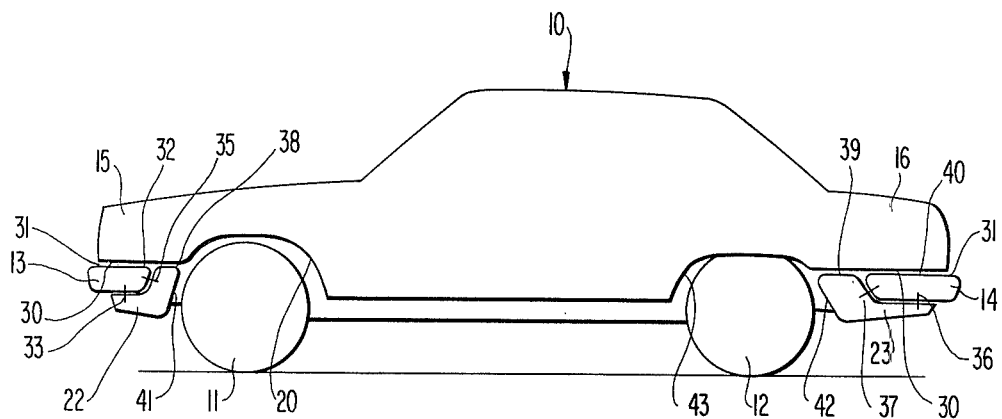
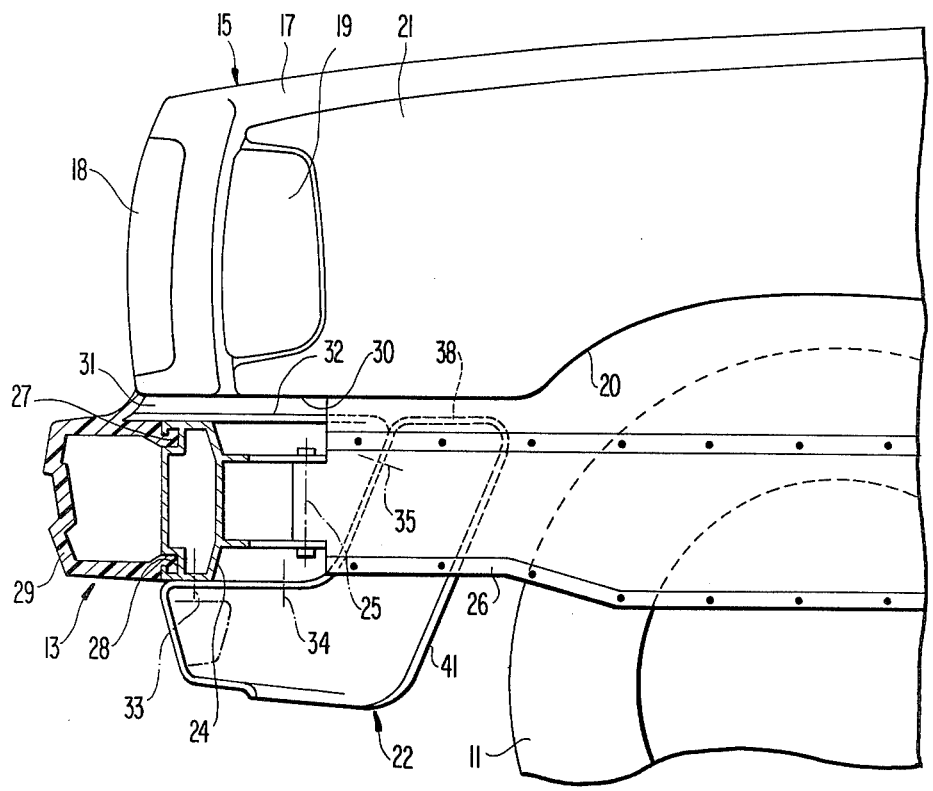
FIG 2

BODY FOR MOTOR VEHICLES

This present invention relates to a body for motor vehicles, especially for passenger motor vehicles, with bumpers arranged in the front and/or rear area of the vehicle and with outer body cover panel parts adjoining the same.

In the hitherto customary passenger motor vehicles, the body cover panel parts are arranged uninterruptedly behind the bumper and are bolted together or welded together with each other. This arrangement is expensive both in manufacture and assembly as also in repair. Already in case of slight collisions, the outer body paneling is exposed to damages which entail high repair costs.

Additionally arrangements are known in the art in which the bumpers form the lower termination of the body cover panels and whose ends extend approximately up to the wheel cutout contours. These large-surfaced bumpers are heavy, unsatisfactory from a styling point of view and expensive. Since in case of accidents the bumpers are exposed most frequently to damages, high repair costs result from this arrangement.

It is the aim of the present invention to so arrange the body cover panel parts adjoining the bumpers and to so construct the same that the manufacture, assembly and repair costs thereof are low, and that damages are far-reachingly precluded in case of relatively smaller collisions.

The underlying problems are solved according to the basic concept of the present invention essentially in that the outer cover panel members above the bumper are not connected with the bumper and in that the cover panel member underneath the bumper forms a separate structural part independent of the upper body cover panel members. Preferably, the lower terminal edge of the upper body panel cover parts have a parallel course relative to the surface of the bumper—under formation of a spacing gap with respect to the same and to the lower body cover panel part.

As a result of the independence of the upper body panel parts from the bumper in accordance with the present invention, the upper body panel parts remain undamaged in case of slight deformations or displacements of the bumper, for example, as a consequence of a slight impact against an obstacle, so that possibly only a repair of the bumper is required. A repair which may be also necessary under certain circumstances or an exchange of the lower body cover panel part is simple and inconsequential from a cost point of view because the lower body panel part according to the present invention is constructed as separate structural part with comparatively small dimensions. As a result thereof, the vehicle body cover panel parts according to the present invention are simple and inexpensive also in manufacture and assembly.

Since the impact forces exerted on the bumper are disposed as a rule in a horizontal plane, i.e., are directed predominantly in the vehicle longitudinal direction, it is particularly appropriate within the scope of the present invention if the lower terminal edge of the upper body cover panel parts and the surface of the bumper extend each in a horizontal plane or essentially in a horizontal plane.

According to a further significant feature of the present invention, the lower body cover panel part, which may be made in one piece or which may be of multi-partite construction, is secured at the bumper or at a structural element carrying the bumper. It is achieved thereby that the lower body cover panel part in case of displacements of the bumper remains undamaged under certain circumstances because it moves along exclusively with the bumper independently of the other body cover panel parts.

In case that the bumper consists of a bearer profile and of a synthetic resinous profile carried by the bearer profile, the lower body cover panel member is preferably secured at the bottom side and/or at the lateral ends of the bearer profile. A simple assembly and disassembly of the lower body cover panel part is made possible by this constructive feature so that this part which is particularly endangered by salt water or stone-throw can be provided with a special surface protection prior to the installation. However, it may also consist in its entirety of synthetic plastic materials.

A further feature of the present invention which favors the constructive characteristics described hereinabove resides in that the lower body cover panel part is drawn up laterally at the ends of the bumper—following the contours thereof—and at the same time forms the lower continuation of the wheel cutout contour surrounded by the upper body panel parts. The lower body cover panel part can be kept short in the vehicle longitudinal direction also in case of a large vehicle overhang due to the drawn-up lower body panel cover part which is drawn up at the ends of the bumper. Therebeyond it is possible with unequally long overhangs to construct the bumpers identical in the front and in the rear and therewith interchangeable.

A spacing gap between the upper body cover panel parts and the bumper and/or the lower body cover panel part may be sealed off on the inside thereof by an elastic sealing lip.

Accordingly, it is an object of the present invention to provide a body for motor vehicles, especially for passenger motor vehicles, which avoids by simple means the aforementioned shortcomings and drawbacks encountered in the prior art.

Another object of the present invention resides in a body for motor vehicles which reduces the cost not only in manufacture and assembly but also in case of repair due to damage of body panel parts.

A further object of the present invention resides in a body for motor vehicles which obviates the need for heavy and expensive bumpers and which far-reachingly leaves the vast majority of the outer body panel parts of this vehicle intact in case of a slight collision which can be absorbed by the bumper.

Still a further object of the present invention resides in a motor vehicle body construction which makes it possible to utilize the same bumper at the front and in the rear, even though the overhang at the two ends of the vehicle is different.

These and other objects, features and advantages of the present invention will become more apparent from the following description when taken in connection with the accompanying drawing which shows, for purposes of illustration only, one embodiment in accordance with the present invention, and wherein:

FIG. 1 is a schematic side elevational view showing the contours of a passenger motor vehicle in accordance with the present invention; and FIG. 2 is a side elevational view, on an enlarged scale, of the front portion of the passenger motor vehicle according to FIG. 1.

Referring now to the drawing wherein like reference numerals are used throughout the two views to designate like parts, according to FIG. 1, reference numeral 10 generally designates the body while reference numerals 11 and 12 designate the wheels of the left vehicle side and reference numerals 13 and 14 the two bumpers of the passenger motor vehicle. The body outer cover panel parts above the bumper 13 and 14—to be referred to hereinafter as upper body cover panel parts—are designated by reference numerals 15 and 16. As can be seen in detail from FIG. 2, the upper body cover panel parts 15 of the front section of the passenger motor vehicle involve the engine hood 17 with radiator grill 18 as well as the sheet metal panel 21 surrounding the headlights 19 and the wheel cutout contour 20. In the rear section of the vehicle, the upper body cover panel parts 16 are formed essentially by the sheet metal body panels surrounding the luggage space.

Body cover panel parts disposed below the bumper 13 and 14—which will be referred to hereinafter as lower body panel parts—are designated by reference numerals 22 and 23 and are shown in heavy full lines in FIG. 1.

As can be seen from FIG. 2, the bumper 13—and correspondingly also the bumper 14 which cannot be seen from FIG. 2—consists of a bumper bearer 24 which is threadably connected at 25 with a longitudinal bearer 26 of the vehicle. A corresponding fastening of the bumper bearer 24 is, of course, also provided at the right forward vehicle end which cannot be seen in FIG. 2. The bumper bearer 24 includes at its forward end two grooves 27 and 28 into which engages a hollow profile 29 of any suitable known synthetic plastic material and forming the bumper, properly speaking.

As can be seen particularly well from FIG. 2, no connection exists between the upper body cover panel parts 15 to 21 and the bumper 13. Instead, the upper body panel parts 15 to 21 terminate at the bottom thereof in a horizontally extending terminal edge 30 which is disposed parallel to the surface of the bumper 13 designated by reference numeral 32—under formation of a spacing gap 31. Corresponding constructive features are, as indicated in FIG. 1, also provided in the rear section of the vehicle. The lower body cover panel part 22 or 23, in contrast thereto, is secured on the bumper 13 or 14 at 33, 34, 35 and 36, 37, respectively. It can be seen from FIG. 2 that the fastening of the lower body cover panel part, for example, of the lower body cover panel part 22 takes place at the bumper bearer, for example, at the bumper bearer 24. The lower body cover panel parts 22 and 23 are thereby drawn up laterally on each side so far along the bumpers 13 and 14 that, on the one hand, their upper terminal edge 38 and 39 is flush with the surface 32 and 40 of the bumper 13 and 14, respectively, and, on the other, they form at 41 and 42 the forward and rearward extension of the wheel cutout contour 20 and 43.

As a result of the construction described hereinabove and of the mutually independent arrangement of the upper body cover panel members 15 and 16 with respect to the respectively coordinated lower body cover panel members 22 and 23, a damage thereof is far-reachingly precluded with comparatively light impact loads of the bumpers 13 and 14. Instead, the bumper 13 or 14 can be slightly displaced in the vehicle longitudinal direction without impairment of the upper body cover panel parts 15 and 16. The bumper 13 or 14 thereby takes along the lower body cover panel part 22 or 23 secured to the same so that the latter also remains far-reachingly protected against damages. If, however, the lower body panel parts 22 and 23 are damaged, then these relatively small parts can be readily disassembled and can be replaced by corresponding new parts with only comparatively slight expenditures.

While we have shown and described only one embodiment in accordance with the present invention, it is uderstood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A body for motor vehicles comprising bumper means arranged in at least one of front and rear areas of the vehicle and body cover panel means adjoining the bumper means, characterized in that cover panel means above the bumper means which form upper body cover panel means are devoid of any connection with the corresponding bumper means, and body cover panel means which form lower body cover panel means forms a separate structural part independent of the upper body cover panel means, a lower terminal edge of the upper body cover panel means has an at least approximately parallel extension with respect to a surface of the bumper means under a formation of a spacing gap with respect to the bumper means and the lower body cover panel means, the lower terminal edge of the upper body cover panel means and the surface of the bumper means extend each in an at least approximately horizontal plane, the lower body cover panel means is secured at a part rigid with the bumper means, and in that the lower body cover panel means is drawn up laterally at ends of the bumper means following contours thereof and simultaneously forms a lower extension of a wheel cutout contour surrounded by the upper body cover panel means.

2. A body according to claim 1, characterized in that each said plane is a horizontal plane.

3. A body according to claim 1, characterized in that the lower body cover panel means is secured at said bumper means.

4. A body according to claim 1, characterized in that the lower body cover panel means is secured at a structural element carrying the bumper means.

5. A body according to claim 1, characterized in that the lower body cover panel means is constructed in one piece.

6. A body according to claim 1, characterized in that the lower body cover panel means consists of several parts.

7. A body according to claim 1, characterized in that upper terminal edges of the drawn up ends of the lower body cover panel means are at least essentially aligned with an upper surface of the bumper means.

8. A body according to claim 7, in which the bumper means consists of a bearer profile and of a synthetic plastic profile carried by said bearer profile, characterized in that the lower body cover panel means is detachably secured at a bottom side of the bearer profile and at the lateral ends of the bearer profile.

9. A body according to claim 8, characterized in that the lower body cover panel means consists of synthetic resinous material.

10. A body according to claim 8, characterized in that the lower body cover panel means is provided with a protective surface against corrosion and stone throw.

11. A body according to claim 8, characterized in that the spacing gap between the upper body cover panel means and at least one of the two parts consisting of bumper means and lower body cover panel means are sealed off by elastic sealing lip means.

12. A body according to claim 11, characterized in that one such bumper means each is arranged in the front and in the rear area of the vehicle, and in that the bumper means are interchangeable.

13. A body according to claim 11, characterized in that the lower body cover panel means is secured at said bumper means.

14. A body according to claim 11, characterized in that the lower body cover panel means is secured at a structural element carrying the bumper means.

15. A body according to claim 11, characterized in that the lower body cover panel means is constructed in one piece.

16. A body according to claim 11, characterized in that the lower body cover panel means consists of several parts.

17. A motor vehicle body which includes a bumper arrangement mounted at least at one of a front and a rear area of the vehicle, the bumper arrangement including a hollow profile bumper member and a bearer means for mounting the hollow profile bumper member, characterized in that upper body cover panel means are arranged adjoining an upper side of the bumper arrangement, the upper body cover panel means terminating in a lower edge spaced from the bumper arrangement so as to define a gap between the upper body cover panel means and the bumper arrangement, said upper body cover panel means are free of any connection with the bumper arrangement so as to permit the bumper arrangement to be displaced in a longitudinal direction of the vehicle upon an application of an impact force to the bumper arrangement without a damaging of the upper body cover panel means, in that lower body cover panel means are arranged adjoining a lower side of the bumper arrangement, the lower body cover panel means are formed as a separate structural part independent of the upper body cover panel means and the bumper arrangement, and in that means are provided for detachably securing said lower body cover panel means to the bumper arrangement such that the lower body cover panel means are displaced with the bumper arrangement upon the application of the impact force on the bumper arrangement so as to protect the lower body cover panel means from damage.

18. A body according to claim 17, characterized in that the securing means are arranged at the lower body cover panel means and the bumper arrangement such that, upon a fastening of the lower body cover panel means, the lower body cover panel means is drawn up laterally at the ends of the bumper member following the contours thereof and simultaneously forms a lower extension of a wheel cutout contour surrounded by the upper body cover panel means.

19. A body according to claim 18, characterized in that upper terminal edges of the drawn up ends of the lower body cover panel means are at least essentially aligned with an upper surface of the bumper member.

20. A body according to claim 17, in which the bearer means consists of a bearer profile and the hollow profile bumper member consists of a synthetic plastic profile carried by said bearer profile, characterized in that the securing means are arranged at a bottom side of the bearer profile and at lateral ends of the bearer profile.

21. A body according to claim 17, characterized in that the lower body cover panel means consists of synthetic resinous material.

22. A body according to claim 17, characterized in that the lower body cover panel means is provided with a protective surface against corrosion and stone throw.

23. A body according to claim 17, characterized in that the gap between the upper body cover panel means and bumper arrangement is sealed off by elastic sealing lip means.

24. A body according to claim 17, characterized in that one such bumper means each is arranged in the front and in the rear area of the vehicle, and in that the bumper means are interchangeable.

25. A body according to claim 17, characterized in that the lower terminal edge of the upper body cover panel means and the surface of the bumper means extend each in an at least approximately horizontal plane.

* * * * *